United States Patent
Kim et al.

(10) Patent No.: US 11,551,642 B2
(45) Date of Patent: Jan. 10, 2023

(54) DISPLAY DRIVING CIRCUIT AND OPERATING METHOD OF THE SAME

(71) Applicant: Samsung Electronics Co., Ltd., Suwon-si (KR)

(72) Inventors: Woojoo Kim, Seoul (KR); Seonghan Jang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/543,000

(22) Filed: Dec. 6, 2021

(65) Prior Publication Data
US 2022/0180841 A1 Jun. 9, 2022

(30) Foreign Application Priority Data
Dec. 8, 2020 (KR) .................. 10-2020-0170744

(51) Int. Cl.
*G09G 3/20* (2006.01)
*G09G 5/12* (2006.01)

(52) U.S. Cl.
CPC ........... *G09G 5/12* (2013.01); *G09G 2310/08* (2013.01); *G09G 2320/0646* (2013.01)

(58) Field of Classification Search
CPC .. G09G 5/12; G09G 2310/08; G09G 2320/06; G09G 2320/0646
See application file for complete search history.

(56) References Cited

U.S. PATENT DOCUMENTS

| | | | |
|---|---|---|---|
| 6,333,745 B1* | 12/2001 | Shimomura | G09G 5/001 345/531 |
| 8,291,456 B2 | 10/2012 | Emoto et al. | |
| 8,878,995 B2 | 11/2014 | Cha et al. | |
| 8,884,977 B2 | 11/2014 | Wang | |
| 9,055,225 B2* | 6/2015 | Yanagidate | H04N 21/4223 |
| 9,160,895 B2 | 10/2015 | Li et al. | |
| 9,318,072 B2* | 4/2016 | Cha | G06F 1/3265 |
| 9,491,724 B2* | 11/2016 | Chen | H04N 19/166 |
| 9,514,511 B2 | 12/2016 | Lee et al. | |
| 9,659,522 B2 | 5/2017 | Jeon | |
| 9,761,202 B2 | 9/2017 | Tann et al. | |
| 9,858,897 B2* | 1/2018 | Han | G09G 5/006 |

(Continued)

*Primary Examiner* — Joe H Cheng
(74) *Attorney, Agent, or Firm* — Harness, Dickey & Pierce, P.L.C.

(57) ABSTRACT

A display driving circuit according to an example embodiment of the inventive concept is disclosed. A display driving circuit may include an interface configured to receive a synchronization packet and image data from the outside; a memory configured to receive the image data from the interface in the command mode; a synchronization controller configured to receive the synchronization packet and generate a flag control signal and an internal synchronization signal; a flag generator configured to generate a first flag signal and a second flag signal; and an image controller configured to receive the image data from the memory in the command mode, receive the image data from the interface in the video mode, wherein the synchronization controller is configured to calculate a delay time between a generation time of the first flag signal and a reception time of the synchronization packet, and is configured to adjust a generation time of the second flag signal.

20 Claims, 15 Drawing Sheets

(56) References Cited

U.S. PATENT DOCUMENTS

| | | | |
|---|---|---|---|
| 10,416,808 B2* | 9/2019 | Shekhar | H04N 5/23245 |
| 10,755,670 B2* | 8/2020 | Seo | G09G 5/006 |
| 10,834,411 B2* | 11/2020 | Kim | G09G 5/006 |
| 2015/0235343 A1* | 8/2015 | Asai | G09G 5/001 |
| | | | 345/534 |
| 2020/0066226 A1 | 2/2020 | Han et al. | |

* cited by examiner

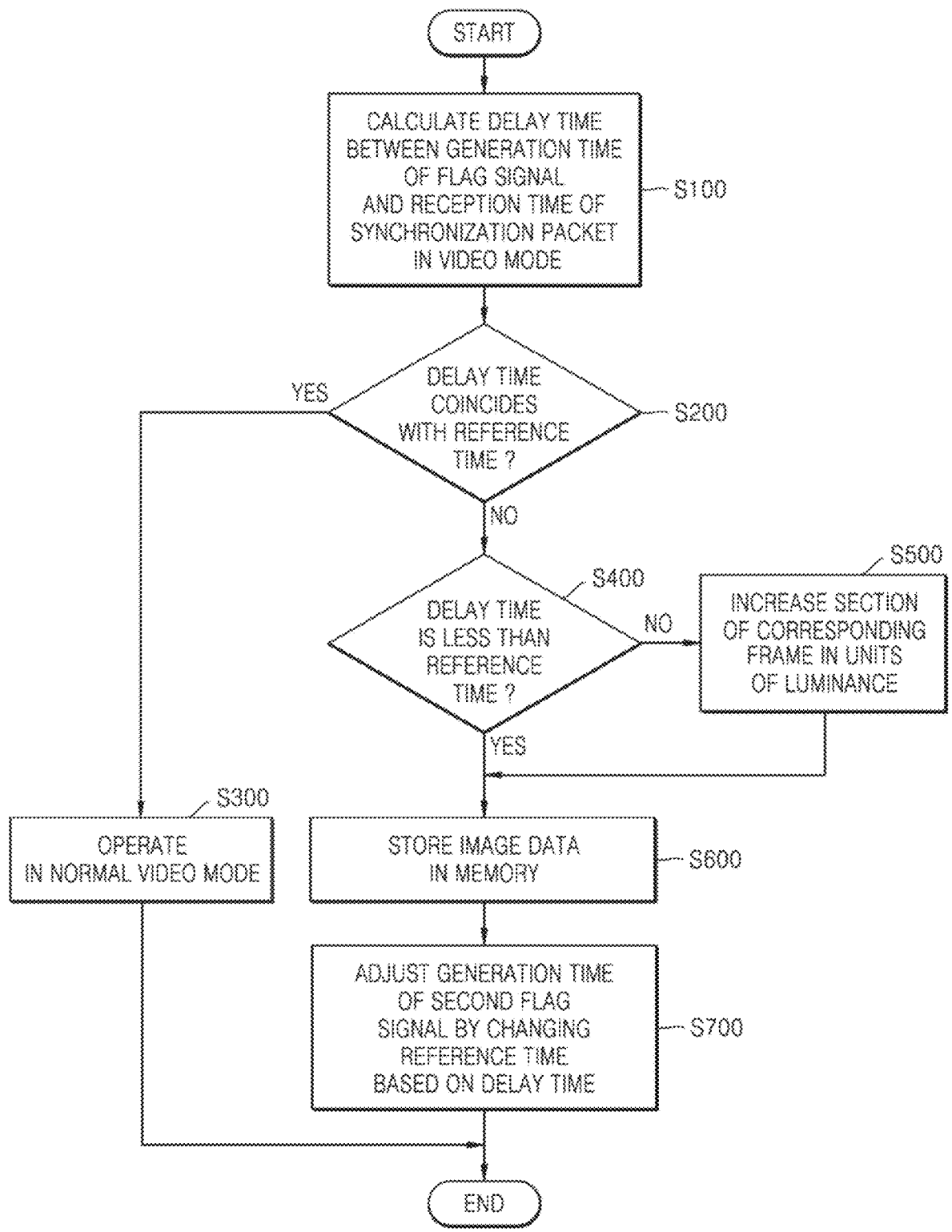

DISPLAY DRIVING CIRCUIT AND OPERATING METHOD OF THE SAME

CROSS-REFERENCE TO RELATED APPLICATION

This application is based on and claims priority under 35 U. S. C. § 119 to Korean Patent Application No. 10-2020-0170744, filed on Dec. 8, 2020, in the Korean Intellectual Property Office, the disclosure of which is incorporated by reference herein in its entirety.

BACKGROUND

At least one technical idea of the inventive concepts relates to a display driving circuit, and in particular, to a display driving circuit for driving a display panel so that an image is displayed on the display panel, and a method of operating the same.

A display device includes a display panel displaying an image and a display driving circuit driving the display panel. The display driving circuit may drive the display panel by receiving image data from a processor and applying an image signal corresponding to the received image data to the data line of the display panel. The display device may be implemented in various forms such as a liquid crystal display (LCD), a light emitting diode (LED) display, an organic LED (OLED) display, and an active matrix OLED (AMOLED) display.

The display device may operate in various operation modes through the control of a host, and seamless switching of the operation mode may be required to switch the operation mode.

SUMMARY

At least one problem to be solved by at least one technical idea of the inventive concepts is to provide a display driving circuit that operates in a command mode and a video mode, which are a plurality of operation modes.

A display driving circuit operating in a video mode and a command mode, according to example embodiments of the inventive concepts for solving the technical problem, the display driving circuit may include an interface configured to receive a synchronization packet and image data from the outside; a memory configured to receive the image data from the interface in the command mode; a synchronization controller configured to receive the synchronization packet from the interface and generate a flag control signal and an internal synchronization signal; a flag generator configured to generate a first flag signal and a second flag signal in response to the flag control signal; and an image controller configured to receive the image data from the memory in the command mode, receive the image data from the interface in the video mode, and drive a display panel based on the image data, wherein the synchronization controller is configured to calculate a delay time between a generation time of the first flag signal and a reception time of the synchronization packet, and is configured to adjust a generation time of the second flag signal based on the delay time.

A method of operating a display driving circuit operating in a video mode and a command mode according to example embodiments of the inventive concepts for solving the technical problem, the method may include receiving, from a host, a command for changing from the command mode to the video mode; generating a first flag signal to transmit the generated first flag signal to the host; receiving a synchronization packet depending on the first flag signal; and adjusting a generation time of a second flag signal and switching a mode to the video mode, based on a delay time between a generation time of the first flag signal and a reception time of the synchronization packet depending on the first flag signal.

A method of operating a display driving circuit according to example embodiments of the inventive concepts for solving the technical problem, the method may include generating a first flag signal and transmitting the generated first flag signal to a host; receiving a synchronization packet depending on the first flag signal and image data; storing the image data in a memory based on a result of comparing a delay time between a generation time of the first flag signal and a reception time of the synchronization packet depending on the first flag signal with a reference time; and adjusting a generation time of a second flag signal by changing the reference time based on the delay time.

BRIEF DESCRIPTION OF THE DRAWINGS

Example embodiments of the inventive concepts will be more clearly understood from the following detailed description taken in conjunction with the accompanying drawings in which:

FIG. 9 is a flowchart illustrating a method of operating a display driving circuit according to example embodiments of the inventive concepts;

DETAILED DESCRIPTION OF EXAMPLE EMBODIMENTS

Hereinafter, various example embodiments of the inventive concepts will be described in connection with the accompanying drawings.

Figure 1:
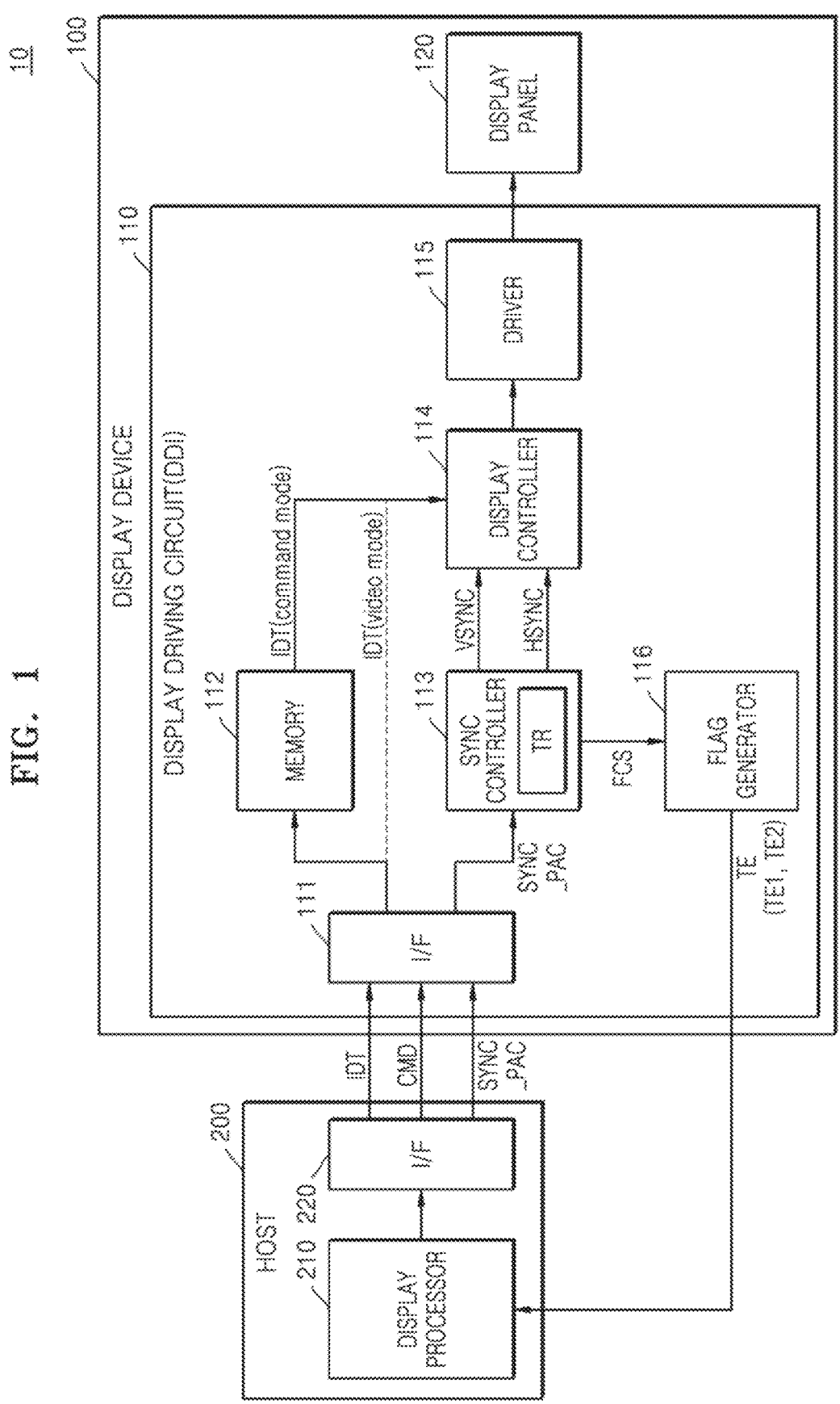
FIG. 1 is a block diagram illustrating a display system according to example embodiments of the inventive concepts.

FIG. 1 is a block diagram illustrating a display system according to example embodiments of the inventive concepts.

A display system 10 according to example embodiments of the inventive concepts may be mounted on, or otherwise interface with, an electronic device having an image display function. For example, electronic devices may include smartphones, tablet personal computers (PCs), portable multimedia players (PMPs), cameras, wearable devices, internet of thing devices, and televisions, digital video disk (DVD) players, refrigerators, air conditioners, air purifiers, set-top boxes, robots, drones, various medical devices, navigation devices, global positioning system (GPS) receivers, advanced drivers assistance system (ADAS), vehicle devices, furniture, or various measuring devices.

Referring to FIG. 1, the display system 10 may include a host 200, a display driving circuit 110 (or a display driving integrated circuit), and/or a display panel 120. In example embodiments, the display driving circuit 110 and the display panel 120 may be implemented as one module, and the module may be referred to as a display device 100. For example, the display driving circuit 110 may be mounted on a circuit film such as a tape carrier package (TCP), a chip on film (COF), or a flexible print circuit (FPC), and may be attached to the display panel 120 in a tape automatic bonding (TAB) manner or be mounted on a non-display area of the display panel 120 in a chip on glass (COG) or chip on plastic (COP) manner.

The host 200 may overall control the display system 10. The host 200 may generate image data IDT to be displayed on the display panel 120, and may transmit the image data IDT, a synchronization packet SYNC_PAC, and a command (e.g., mode change command CMD) to the display driving circuit 110. In FIG. 1, the image data IDT, the synchronization packet SYNC_PAC, and the command CMD are shown as separate signals, but may be transmitted to the display driving circuit 110 in a single packet, and may be separated from each other in an interface 111 of the display driving circuit 110.

The host 200 may be an application processor. However, the present inventive concepts are not limited thereto, and the host 200 may be implemented as various types of processors such as a central processing unit (CPU), a microprocessor, a multimedia processor, and a graphic processor. In example embodiments, the host 200 may be implemented as an integrated circuit (IC), and may be implemented as a mobile application processor (AP) or a system on chip (SoC).

The host 200 may include a display processor 210 and an interface 220. The display processor 210 may control the operation of the display device 100. The display processor 210 may transmit image data IDT to be displayed on the display device 100, the synchronization packet SYNC_PAC for timing control, and the command CMD for changing an operation mode of the display device 100 to the display device 100 through the interface 220.

The display driving circuit 110 may display an image on the display panel 120 by converting the image data IDT received from the host 200 into image signals for driving the display panel 120, and supplying the image signals to the display panel 120.

The display driving circuit 110 may operate in a plurality of operation modes. The operation modes may include a command mode receiving only image data IDT from the host 200 and a video mode for receiving image data IDT and the synchronization packet SYNC_PAC for timing control from the host 200 together. For example, the display device 100 may display a still image in the command mode and a moving image in the video mode. The display driving circuit 110 may switch the operation mode in response to the command CMD received from the host 200. In order to seamlessly switch the operation mode from the command mode to the video mode, the display driving circuit 110 may operate in a switching mode between a section operating in the command mode and a section operating in the video mode. The operation of the display driving circuit 110 in the switching mode will be described in detail in the following drawings.

The display driving circuit 110 may include the interface 111, a memory 112, a synchronization controller 113, a display controller 114, a driver 115, and/or a flag generator 116. The display driving circuit 110 may receive the image data IDT, the synchronization packet SYNC_PAC, and the command CMD from the host 200 through the interface 111. In example embodiments, the interface 220 of the host 200 and the interface 111 of the display driving circuit 110 may be a mobile industry processor interface (MIPI).

The memory 112 may store the image data IDT received through the interface 111 in the command mode and may transmit the image data IDT to the display controller 114. In example embodiments, the memory 112 may be a graphic RAM (GRAM). On the other hand, in the video mode, the image data IDT received through the interface 111 is not stored in the memory 112 and may be transmitted to the display controller 114.

The synchronization controller 113 may receive the synchronization packet SYNC_PAC through the interface 111. The synchronization controller 113 may receive the synchronization packet SYNC_PAC through the interface 111 in the video mode, and generate internal synchronization signals VSYNC and HSYNC based on the synchronization packet SYNC_PAC. The synchronization controller 113 may output an internal vertical synchronization signal VSYNC having the same period as the period of the vertical synchronization packet of the synchronization packet SYNC_PAC, and may output an internal horizontal synchronization signal HSYNC having the same period as the period of the horizontal synchronization packet of the synchronization packet SYNC_PAC.

On the other hand, the synchronization controller 113 may directly generate the internal synchronization signals VSYNC and HSYNC without receiving the synchronization packet SYNC_PAC in the command mode. The internal synchronization signals VSYNC and HSYNC may include the internal vertical synchronization signal VSYNC and the internal horizontal synchronization signal HSYNC.

The synchronization controller 113 may transmit a flag control signal FCS to the flag generator 116. The synchronization controller 113 may generate the flag control signal FCS to synchronize the synchronization packet SYNC_PAC and the internal synchronization signals VSYNC and HSYNC with each other in the switching mode for switching from the command mode to the video mode.

The display controller 114 may generate control signals for controlling the driver 115 by receiving image data IDT and the internal synchronization signals VSYNC and HSYNC. The driver 115 may provide voltages to gate lines and data lines of the display panel 120 in response to the control signals. The operation of the display controller 114 and the driver 115 will be described in detail later with reference to FIG. 2.

The flag generator 116 may generate a flag signal (TE, or a tearing effect control signal) in response to the flag control signal FCS, and may transmit the flag signal TE to the host 200. For example, a rising edge of the flag signal TE may be regarded as a generation time of the flag signal TE.

The host 200 may receive the flag signal TE and control a generation time or transmission time of the synchronization packet SYNC_PAC based on the flag signal TE. Accordingly, a generation time of the internal synchronization signals VSYNC and HSYNC, that is, a start time of each period of the internal synchronization signals VSYNC and HSYNC for synchronization, may vary depending on the flag signal TE. For example, the generation time of the internal vertical synchronization signal VSYNC may be determined depending on the generation time of the flag signal TE.

The generation time of the flag signal TE may be controlled based on a preset reference time TR. For example, the reference time TR may be preset by the host 200. The time from the time when the flag signal TE is generated to the time when the synchronization packet SYNC_PAC is predicted to be received by the display driving circuit 110 may be set as the reference time TR, and thus, the display driving circuit 110 may be set so that the flag signal TE is generated prior to the generation time of the internal synchronization signals VSYNC and HSYNC by the reference time TR.

In example embodiments, in the switching mode for switching from the command mode to the video mode, the synchronization controller 113 may adjust the reference time TR based on the generation time of the first flag signal, the reception time of the synchronization packet SYNC_PAC, and the generation time of the internal synchronization signals VSYNC and HSYNC. For example, the synchronization controller 113 may calculate a delay time between the generation time of the first flag signal and the reception time of the synchronization packet SYNC_PAC, and may change the reference time TR based on a result of comparing the delay time with the reference time TR. The synchronization controller 113 may adjust the generation time of the second flag signal to be transmitted following the first flag signal by adjusting the reference time TR, and may generate the flag control signal FCS based on the generation time of the adjusted second flag signal. The display driving circuit 110 may synchronize the synchronization packet SYNC_PAC and the internal synchronization signals VSYNC and HSYNC with each other by generating a flag control signal FCS for adjusting the generation time of the flag signal TE, and seamless conversion from the command mode to the video mode may be performed.

The display panel 120 is a display unit on which an image is actually displayed, and may be one of a thin film transistor-liquid crystal display (TFT-LCD), an organic light emitting diode (OLED) display, a field emission display, a plasma display panel (PDP), and the like, which are a display device that displays a two-dimensional image by receiving electrically transmitted image signals. The display panel 120 may be implemented as another type of flat panel display or a flexible display panel.

Figure 2:
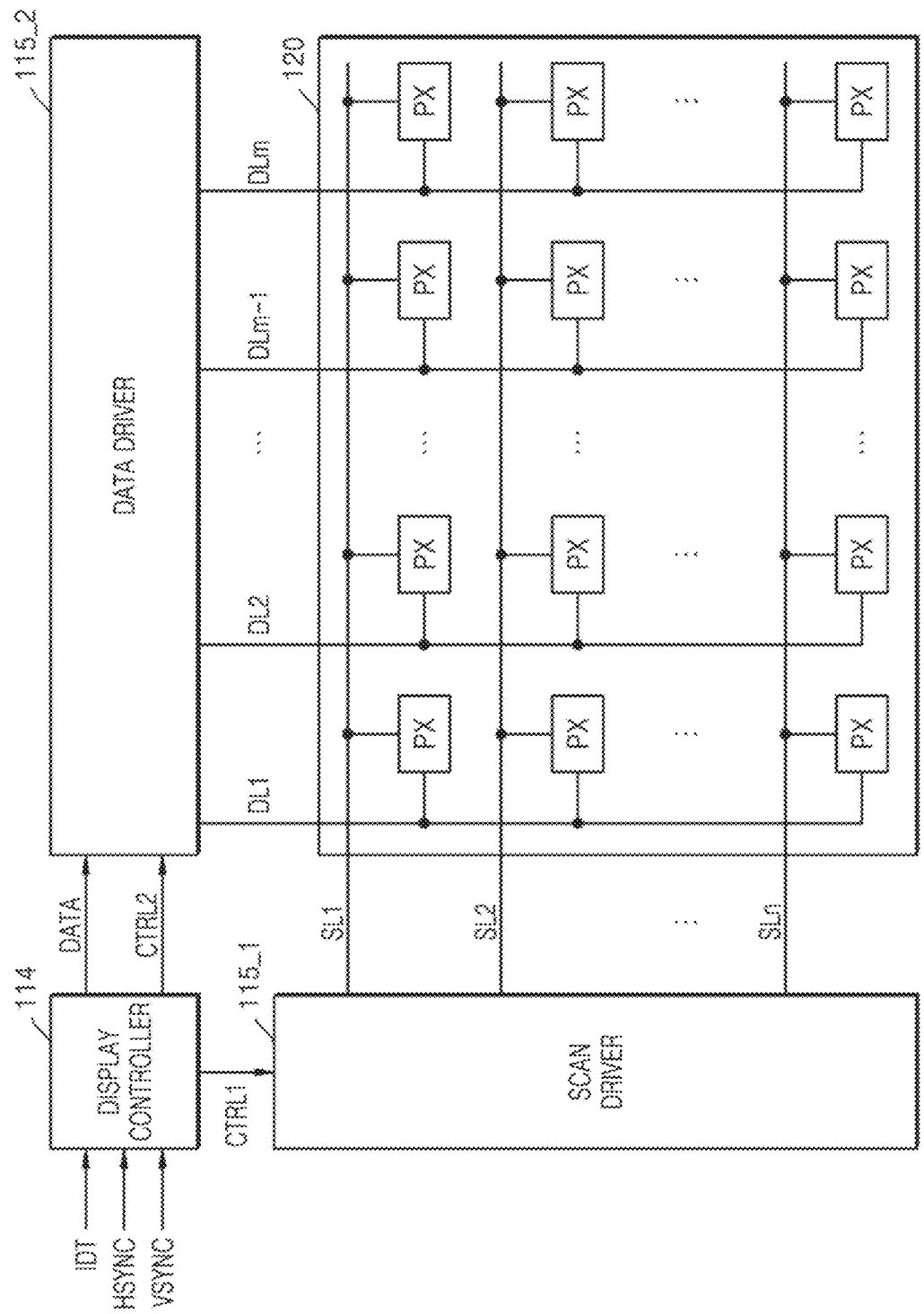
FIG. 2 is a block diagram illustrating a partial configuration of a display device according to example embodiments of the inventive concepts.

FIG. 2 is a block diagram illustrating a partial configuration of a display device according to example embodiments of the inventive concepts, and may correspond to the display controller 114, the driver 115, and the display panel 120 of FIG. 1.

Referring to FIGS. 1 and 2, the driver 115 may include a scan driver 115_1 and a data driver 115_2. However, the display driving circuit 110 may not include the scan driver 115_1, and the scan driver 115_1 may be included in the display device 100 in a separate configuration from the display driving circuit 110.

The display panel 120 includes a plurality of pixels PXs arranged in a matrix form, and may display an image for each frame. The display panel 120 may include scan lines SL1 to SLn arranged in a row direction, data lines DL1 to DLm arranged in a column direction, and the pixels PXs formed at intersections of the scan lines SL1 to SLn and the data lines DL1 to DLm.

The scan driver 115_1 may sequentially select the scan lines SL1 to SLn by sequentially supplying a scan-on signal to the scan lines SL1 to SLn in response to a scan control signal CTRL1 provided from the display controller 114. Based on the scan-on signal output from the scan driver 115_1, the scan lines SL1 to SLn are sequentially selected, and a gray voltage corresponding to the pixels PX is applied to the pixels PXs connected to the selected scan line through the data lines DL1 to DLm, so that a display operation may be performed. During a period in which the scan-on signal is not supplied to the scan lines SL1 to SLn, a scan-off signal (e.g., a scan voltage with a logic high level) may be supplied to the scan lines SL1 to SLn.

In response to a data control signal CTRL2, the data driver 115_2 converts data DATA corresponding to the image data IDT into image signals, which are analog signals, and provide the image signals to the data lines DL1 to DLm. The data driver 115_2 may include a plurality of channel amplifiers, and each of the plurality of channel amplifiers may provide image signals to at least one data line corresponding to each of the amplifiers.

The display controller 114 may control the overall operation of the display panel 120. The display controller 114 may be implemented in hardware, software, or a combination of hardware and software, and for example, the display controller 114 may be implemented as digital logic circuits and registers that perform various functions below.

The display controller 114 may receive the image data IDT, an internal horizontal synchronization signal HSYNC, and an internal vertical synchronization signal VSYNC, and may generate a control signal (e.g., the scan control signal CTRL1 and the data control signal CTRL2) for controlling the data driver 115_2 and the scan driver 115_1 based on the received signals. In addition, the display controller 114 may convert the format of the image data IDT received from the outside of the display driving circuit 110 to conform to the interface specification with the data driver 115_2, and may transmit the converted data DATA to the data driver 115_2.

Figure 3:
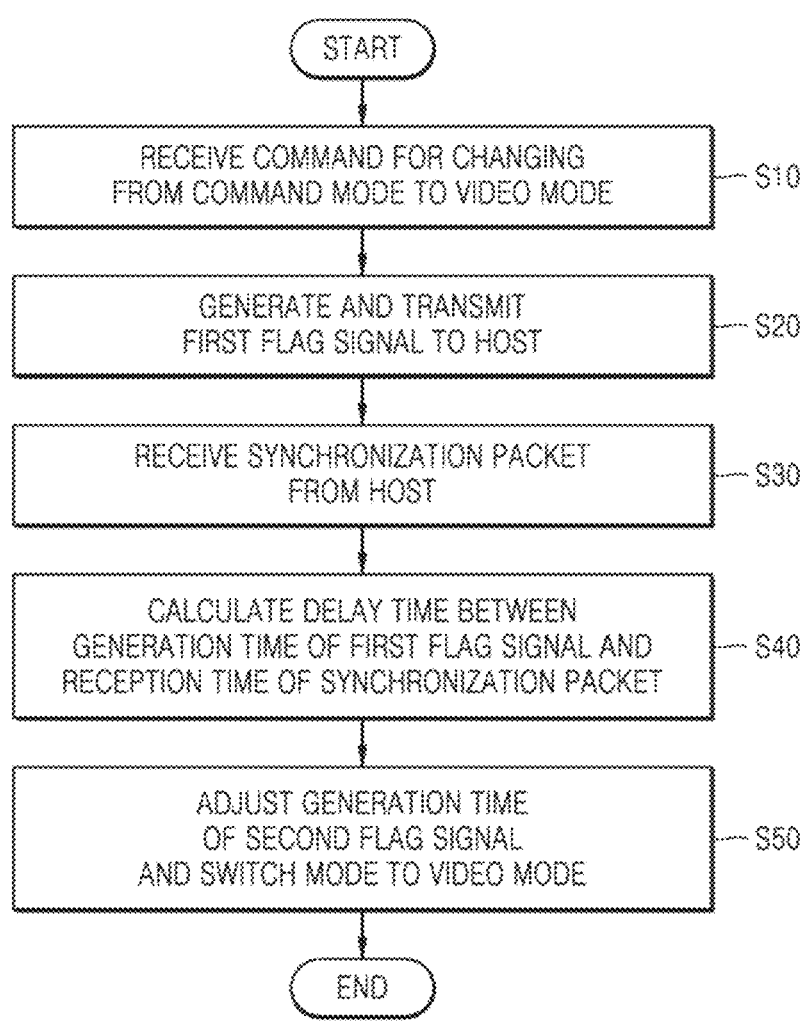
FIGS. 3 and 4 are flowcharts illustrating a method of operating a display driving circuit according to example embodiments of the inventive concepts.
Figure 4:
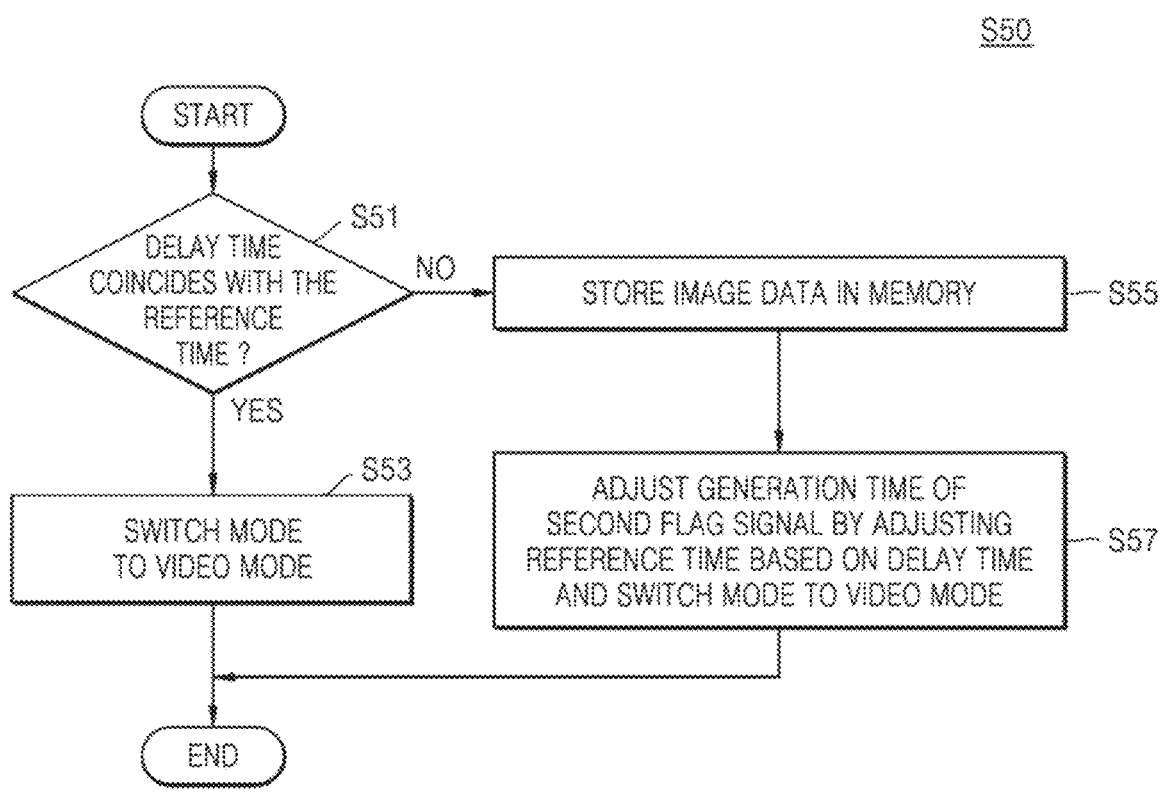

FIGS. 3 and 4 are flowcharts illustrating a method of operating a display driving circuit according to example embodiments of the inventive concepts. FIG. 3 is a flowchart illustrating an operation of a display driving circuit in a switching mode prepared to change from a command mode to a video mode. FIG. 4 is an example of operation S50 of FIG. 3, and operation S50 may include operations S51 to S57.

Referring to FIGS. 1 and 3, the display driving circuit 110 may receive a command CMD for changing from the command mode to the video mode in operation S10. In response to the command CMD, the display driving circuit 110 may operate in the switching mode.

The display driving circuit 110 may generate and transmit the first flag signal to the host 200 in operation S20. When the host 200 receives the first flag signal, the host 200 may transmit the synchronization packet SYNC_PAC to the display driving circuit 110. The display driving circuit 110 may receive the synchronization packet SYNC_PAC from the host 200 in operation S30.

The display driving circuit 110 may calculate a delay time between the generation time (or transmission time) of the first flag signal and the reception time of the synchronization packet SYNC_PAC in operation S40. For example, the display driving circuit 110 may calculate a difference time between the reception time of the synchronization packet SYNC_PAC and the generation time of the internal vertical synchronization signal VSYNC, and may calculate a delay time by calculating a difference value between the reference time TR and the difference time.

In operation S50, the display driving circuit 110 may adjust the generation time (or transmission time) of the second flag signal transmitted following the first flag signal based on the delay time, and switch the mode to the video mode. For example, when the delay time coincides with the reference time TR, it may be seen that the vertical synchronization packet included in the synchronization packet SYNC_PAC transmitted from the host 200 and the internal vertical synchronization signal VSYNC are synchronized with each other. Accordingly, the display driving circuit 110 may generate the second flag signal based on the reference time TR, and the mode may be seamlessly switched from the command mode to the video mode.

Referring to FIGS. 1 and 4, in operation S51, the display driving circuit 110 may determine whether a delay time between the generation time of the first flag signal and the reception time of the synchronization packet coincides with the reference time TR. In the present specification, the term "coincidence" may mean that the difference between the two values is within a set error range, and an error range corresponding to a reference of the coincidence may be preset in the control logic of the display driving circuit 110.

When the delay time between the generation time of the first flag signal and the reception time of the synchronization packet coincides with the reference time TR, the display driving circuit 110 may switch the mode to the video mode in operation S53. Following the first flag signal, a second flag signal may be generated based on a reference time TR.

As the mode is switched to the video mode, the display driving circuit 110 may generate the internal synchronization signals VSYNC and HSYNC based on the synchronization packet SYNC_PAC corresponding to the first flag signal, and the image data IDT received after transmitting the first flag signal may be transmitted to the display controller 114 without being stored in the memory 112.

When the delay time between the generation time of the first flag signal and the reception time of the synchronization packet is different from the reference time TR, the display driving circuit 110 may store the image data IDT in the memory 112 in operation S55. In the present specification, the term "difference" may mean that the difference between the two values is outside a set error range.

In operation S57, the display driving circuit 110 may adjust the generation time of the second flag signal by adjusting the reference time TR based on the delay time and may switch the mode to the video mode. The flag signal TE may include the first flag signal and the second flag signal generated after the first flag signal.

For example, in operation S57, the display driving circuit 110 may change the reference time TR to coincide with the delay time, and adjust the generation time of the second flag signal depending on the changed reference time TR. The display driving circuit 110 may generate the internal synchronization signals VSYNC and HSYNC based on the synchronization packet SYNC_PAC corresponding to the second flag signal in the video mode, and the image data IDT received after transmitting the second flag signal may be transmitted to the display controller 114 without being stored in the memory 112.

Figure 5:
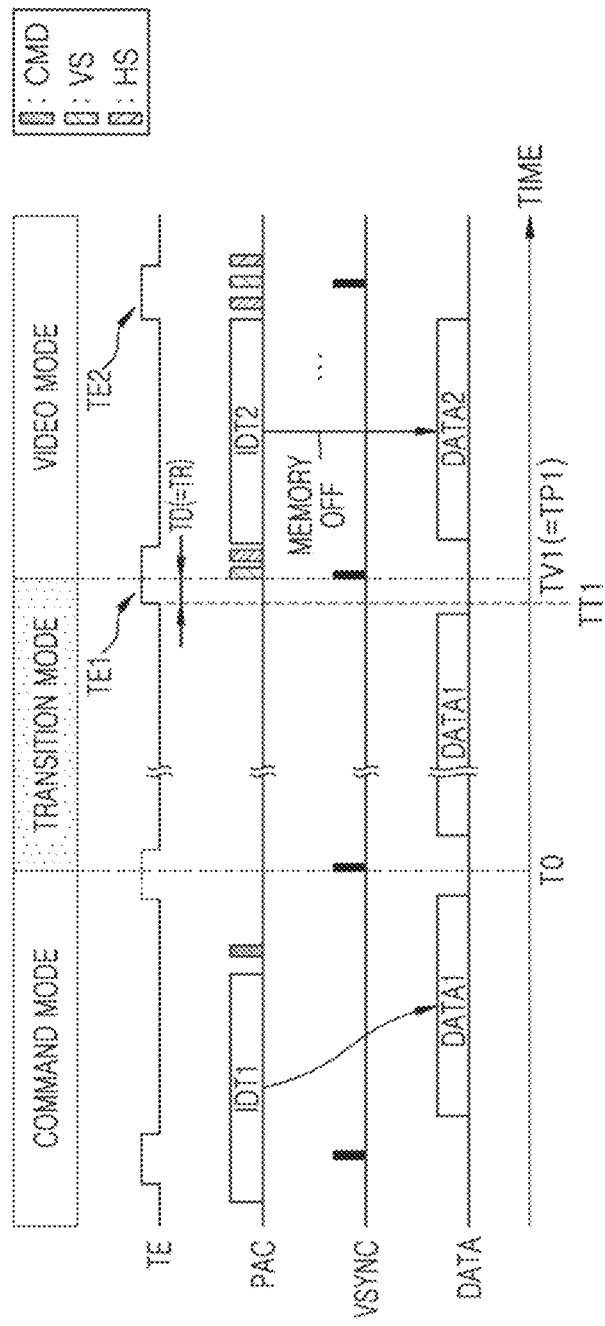
FIGS. 5 to 7 are timing diagrams for describing an operation of a display driving circuit according to example embodiments of the inventive concepts.
Figure 6:
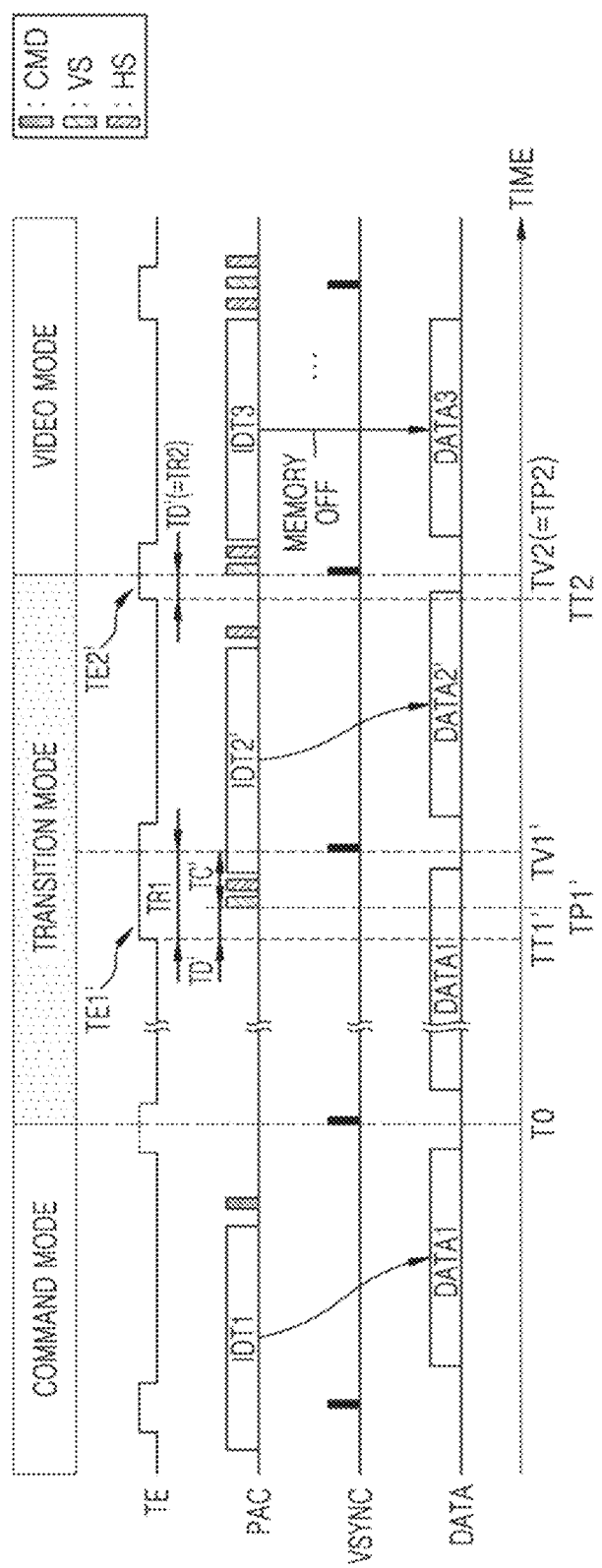
Figure 7:
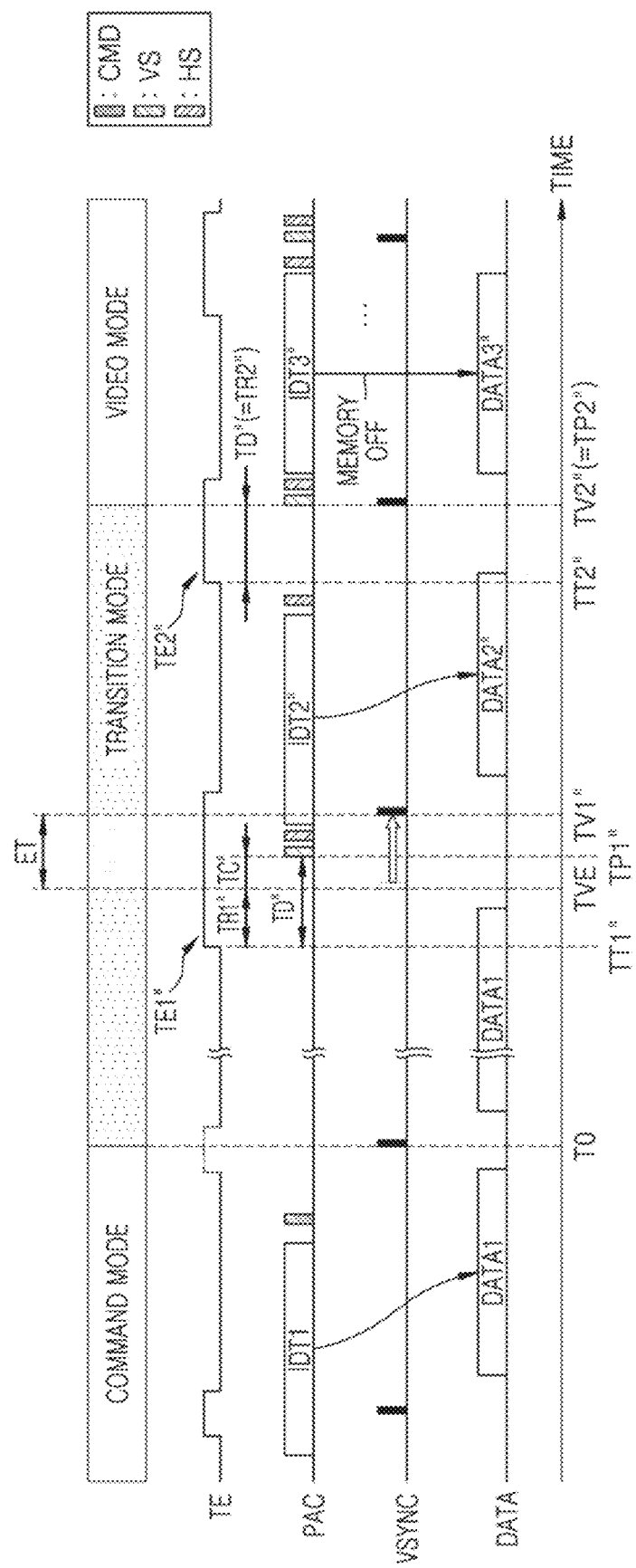

FIGS. 5 to 7 are timing diagrams for describing an operation of a display driving circuit according to example embodiments of the inventive concepts. FIGS. 5 to 7 are timing diagrams for explaining an operation of a display driving circuit in a switching mode preparing to change a mode from a command mode to a video mode. In the description of FIGS. 6 and 7, descriptions previously given with reference to FIG. 5 will be omitted.

Referring to FIGS. 1 and 5, the display driving circuit 110 may receive a packet PAC from the host 200, and the packet PAC may include a command CMD, image data IDT1 and IDT2, a vertical synchronization packet VS, and a horizontal synchronization packet HS. In some example embodiments, the packet PAC may be a set of bits.

The first image data IDT1 received in the command mode may be stored in the memory 112, and an image may be displayed on the display panel 120 based on the first data DATA1 corresponding to the first image data IDT1 with a time difference from the time when the first image data IDT1 is received.

When the command CMD for mode switching is received in the command mode, the display driving circuit 110 may operate in the switching mode from the time T0, the flag signal TE transmitted in the command mode is masked, and an image may be displayed on the display panel 120 depending on the first data DATA1 until new image data is received.

The display driving circuit 110 may transmit the first flag signal TE1 to the host 200 based on the reference time TR, and the host 200 may transmit the vertical synchronization packet VS by receiving the first flag signal TE1 In some example embodiments, the first reception time TP1 of the vertical synchronization packet VS based on the first flag signal TE1 may be a time delayed by a delay time TD from the first generation time TT1 of the first flag signal TE1 The first generation time TT1 of the first flag signal TE1 may correspond to a rising edge of the first flag signal TE1

The reference time TR may be a reference time for determining a first generation time TT1 at which the first flag signal TE1 is first generated before generating the internal vertical synchronization signal VSYNC. Depending on the preset reference time TR, the display driving circuit 110 may generate the first flag signal TE1 and then generate the internal vertical synchronization signal VSYNC after the reference time TR has elapsed.

The generation time TV1 of the internal vertical synchronization signal VSYNC illustrated and described in the following timing diagrams including FIG. 5 may mean the start time of one period of the internal vertical synchronization signal VSYNC. A frame may start at the start time of one period of the internal vertical synchronization signal VSYNC, and a section from the start time of one period of the internal vertical synchronization signal VSYNC to the start of the next period may mean one frame.

FIG. 5 illustrates an example in which the delay time TD coincides with the preset reference time TR. Referring to FIG. 5, as the delay time TD coincides with the preset reference time TR, the first reception time TP1 of the vertical synchronization packet VS received after the display driving circuit 110 transmits the first flag signal TE1 may coincide with the generation time TV1 generating the internal vertical synchronization signal VSYNC. Accordingly, the display driving circuit 110 may switch to the video mode after transmitting the first flag signal TE1, and the second image data IDT2 received after transmitting the first flag signal TE1 is not stored in the memory 112 and may be directly converted into second data DATA2.

The display driving circuit 110 may generate the second flag signal TE2 based on the reference time TR in the video mode and transmit the second flag signal TE2 to the host

200. The host 200 may receive the second flag signal TE2 and transmit the vertical synchronization packet VS.

Referring to FIGS. 1 and 6, the display driving circuit 110 may receive a packet PAC from the host 200, and the packet PAC may include a command CMD, image data IDT1, IDT2', and IDT3, the vertical synchronization packet VS, and the horizontal synchronization packet HS.

The display driving circuit 110 may transmit a first flag signal TE1' to the host 200 in the switching mode, and the host 200 receives the first flag signal TE1' and transmits the vertical synchronization packet VS. In some example embodiments, a first reception time TP1' of the vertical synchronization packet VS based on the first flag signal TE1' may be a time delayed by a delay time TD' from the first generation time TT1' of the first flag signal TE1'.

With reference to FIG. 6, an example in which the delay time TD' is different from a preset first reference time TR1 is described. In detail, an example in which the delay time TD' is shorter than the first reference time TR1 is described. The display driving circuit 110 may calculate a delay time TD' by calculating a difference value between the first reference time TR1 and a difference time TC'. In some example embodiments, the difference time TC' may be a time between the first reception time TP1' of the vertical synchronization packet VS based on the first flag signal TE1' and the generation time TV1' of generating the internal vertical synchronization signal VSYNC.

Because the first reception time TP1' of the vertical synchronization packet VS based on the first flag signal TE1' does not coincide with the generation time TV1' of generating the internal vertical synchronization signal VSYNC, the display driving circuit 110 may continue to operate in the switching mode without switching to the video mode, and the second image data IDT2 ' received after transmitting the first flag signal TE1' may be stored in the memory 112 and then converted into second data DATA2' when a predetermined or alternatively, desired time elapses.

The display driving circuit 110 may newly set a second reference time TR2 to coincide with the delay time TD'. For example, the second reference time TR2 may be calculated by subtracting the difference time TC' from the first reference time TR1.

The display driving circuit 110 may adjust the second generation time TT2 of the second flag signal TE2' based on the second reference time TR2. The display driving circuit 110 may transmit the second flag signal TE2' to the host 200 at the adjusted second generation time TT2, and the host 200 may transmit the vertical synchronization packet VS by receiving the second flag signal TE2'. In some example embodiments, the second reception time TP2 of the vertical synchronization packet VS based on the second flag signal TE2' may be delayed by the delay time TD' from the second generation time TT2 of the second flag signal TE2'.

As the delay time TD' coincides with the second reference time TR2, the second reception time TP2 of the vertical synchronization packet VS received after the display driving circuit 110 transmits the second flag signal TE2' may coincide with the generation time TV2 at which the internal vertical synchronization signal VSYNC is generated. Accordingly, the display driving circuit 110 may switch to the video mode after transmitting the second flag signal TE2', and the third image data IDT3 received after transmitting the second flag signal TE2' is not stored in the memory 112 and may be directly converted into third data DATA3.

However, unlike FIG. 6, when the delay time TD' of the vertical synchronization packet VS based on the second flag signal TE2' is different from the second reference time TR2, the display driving circuit 110 may not operate in the video mode. In order to generate a third flag signal for a next frame, a third reference time may be adjusted again based on the delay time TD'.

Referring to FIGS. 1 and 7, the display driving circuit 110 may receive a packet PAC from the host 200, and the packet PAC may include a command CMD, image data IDT1, IDT2", and IDT3", a vertical synchronization packet VS, and a horizontal synchronization packet HS.

The display driving circuit 110 may transmit a first flag signal TE1" to the host 200 in the switching mode, and the host 200 may transmit a vertical synchronization packet VS by receiving the first flag signal TE1". In some example embodiments, the first reception time TP1" of the vertical synchronization packet VS based on the first flag signal TE1 "may be delayed by a delay time TD" from the first generation time TT1" of the first flag signal TE1".

With reference to FIG. 7, an example in which the delay time TD" is different from a preset first reference time TR1" is described, and in detail, the delay time TD "is greater than the first reference time TR1". The display driving circuit 110 may calculate the delay time TD "by adding the difference time TC" to the first reference time TR1". In some example embodiments, the difference time TC" may be a time between the first reception time TP1" of the vertical synchronization packet VS based on the first flag signal TE" and a time TVE at which the first reference time TR1" has elapsed after generating the first flag signal TE".

Because the first reception time TP1" of the vertical synchronization packet VS based on the first flag signal TE1" does not coincide with the generation time TV1" of generating the internal vertical synchronization signal VSYNC, the display driving circuit 110 may continue to operate in the switching mode without switching to the video mode, and the second image data IDT2" received after transmitting the first flag signal TE1 "may be stored in the memory 112 and then converted into second data DATA2" when a predetermined or alternatively, desired time elapses.

The display driving circuit 110 may be set to generate an internal vertical synchronization signal VSYNC after the first flag signal TE1" is generated and then the first reference time TR1" elapses. When the first delay time TD1" is longer than the first reference time TR", that is, when the vertical synchronization packet VS is not received even if the first reference time TR1" elapses after generating the first flag signal TE1 the display driving circuit 110 may increase the corresponding frame by the extended time ET. By generating the internal vertical synchronization signal VSYNC after the extended time ET from the time TVE at which the first reference time TR1" has elapsed after generating the first flag signal TE1", the section of a frame in which an image based on the first data DATA1" is displayed on the display panel 120 may be increased. That is, the display driving circuit 110 may delay the generation time TV1" of the internal vertical synchronization signal VSYNC corresponding to the first flag signal TE1" later than the time TVE at which the first reference time TR1" has elapsed after generating the first flag signal TE1". In example embodiments, the display driving circuit 110 may increase the section of the frame in a luminance adjustment unit, and for example, the extension time ET may be a multiple of the luminance adjustment unit.

The display driving circuit 110 may newly set the second reference time TR2 "to coincide with the delay time TD".

For example, the second reference time TR2" may be calculated by adding the difference time TC" to the first reference time TR1".

The display driving circuit 110 may adjust the second generation time TT2" of the second flag signal TE2" based on the second reference time TR2". The display driving circuit 110 may transmit a second flag signal TE2" to the host 200 at the adjusted second generation time TT2", and the host 200 may receive the second flag signal TE2" and transmit the vertical synchronization packet VS. In some example embodiments, the second reception time TP2" of the vertical synchronization packet VS based on the second flag signal TE2" may be delayed by the delay time TD" from the second generation time TT2" of the second flag signal TE2".

As the delay time TD" coincides with the second reference time TR2", the second reception time TP2 of the vertical synchronization packet VS received after the display driving circuit 110 transmits the second flag signal TE2" may coincide with the generation time TV2" at which the internal vertical synchronization signal VSYNC is generated. Accordingly, the display driving circuit 110 may switch to the video mode after transmitting the second flag signal TE2", and the third image data IDT3" received after transmitting the second flag signal TE2" is not stored in the memory 112 and may be directly converted into third data DATA3".

However, unlike FIG. 7, when the delay time TD" of the vertical synchronization packet VS based on the second flag signal TE2" is different from the second reference time TR2", the display driving circuit 110 may not operate in the video mode. In order to generate a third flag signal for a next frame, a third reference time may be adjusted again based on the delay time TD".

Figure 8A:
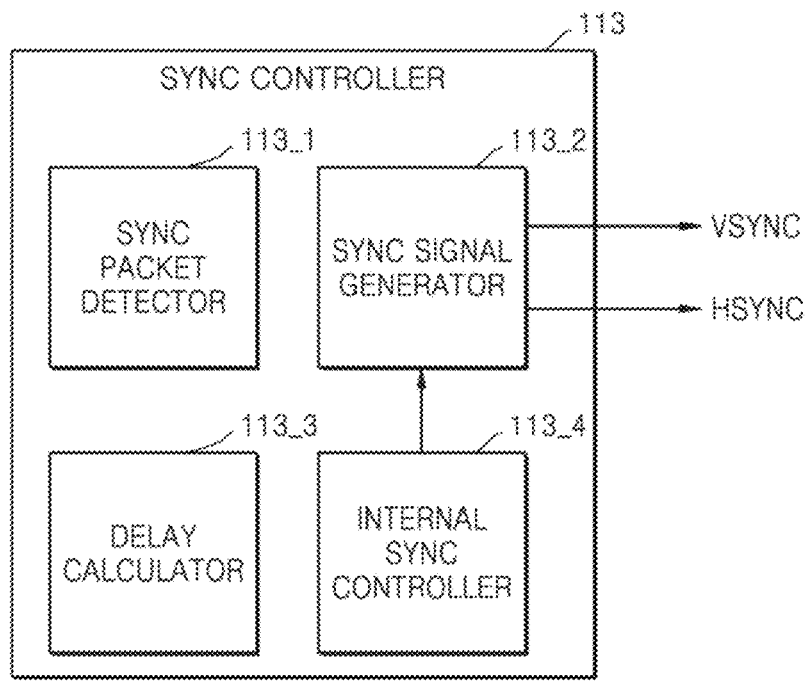
FIGS. 8A to 8C are block diagrams illustrating a synchronization controller of a display driving circuit according to example embodiments of the inventive concepts.
Figure 8B:
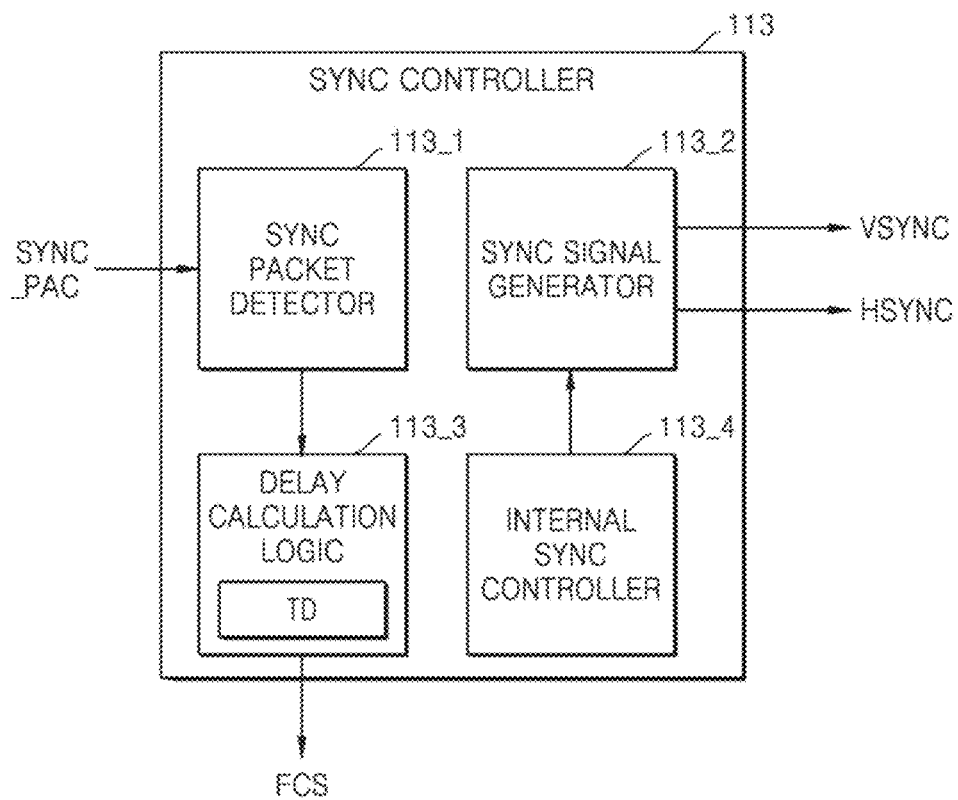
Figure 8C:
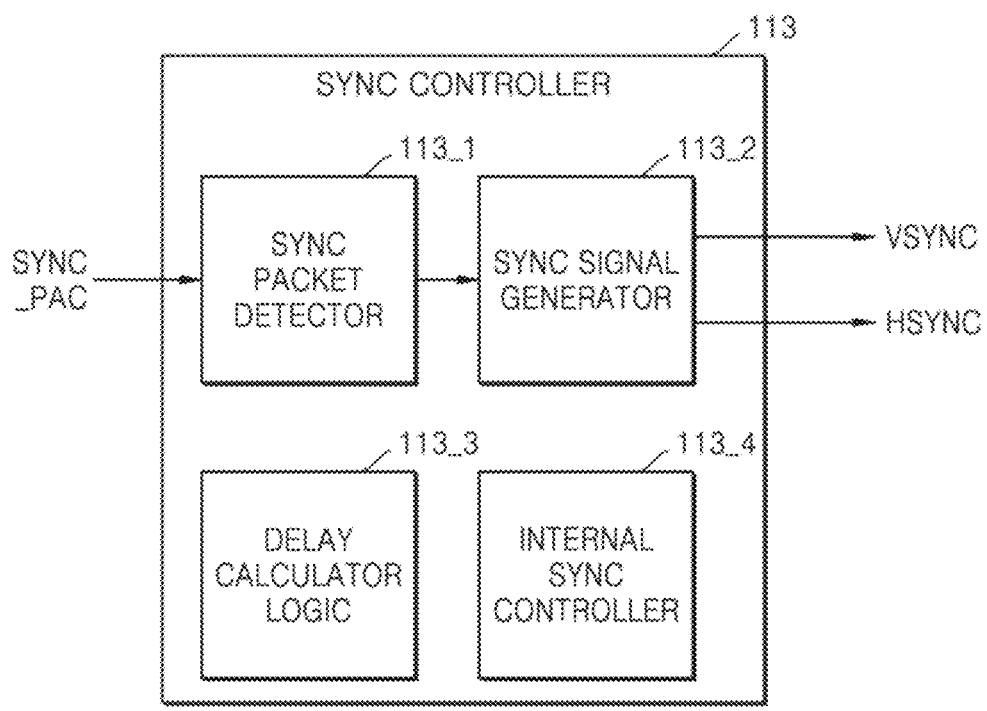

FIGS. 8A to 8C are block diagrams illustrating a synchronization controller of a display driving circuit according to example embodiments of the inventive concepts. FIG. 8A may be a diagram for explaining an operation of a synchronization controller in a command mode, FIG. 8B may be a diagram for explaining an operation of a synchronization controller in a switching mode, and FIG. 8C may be a diagram for explaining an operation of the synchronization controller in a video mode. Alternatively, FIG. 8B may be a diagram for explaining an operation of a synchronization controller in a video memory mode of a video mode to be described with reference to FIGS. 10 and 11, and FIG. 8C may be a diagram for explaining an operation of a synchronization controller in a normal video mode of a video mode to be described with reference to FIGS. 10 and 11.

Referring to FIGS. 1 and 8A, the synchronization controller 113 may include a synchronization packet detector 113_1, a synchronization signal generator 113_2, a delay calculator 113_3, and/or an internal synchronization controller 113_4. Each of the synchronization packet detector 113_1, the synchronization signal generator 113_2, the delay calculator 113_3, and the internal synchronization controller 113_4 may be implemented in hardware or software.

In the command mode, the internal synchronization controller 113_4 may control the synchronization signal generator 113_2, and the synchronization signal generator 113_2 may generate an internal vertical synchronization signal VSYNC and an internal horizontal synchronization signal HSYNC under the control of the internal synchronization controller 113_4. Under the control of the internal synchronization controller 113_4, the synchronization signal generator 113_2 may adjust the generation time and output time of the internal vertical synchronization signal VSYNC and the internal horizontal synchronization signal HSYNC. That is, in the command mode, the synchronization controller 113 may directly determine a timing and a generation period at which the internal vertical synchronization signal VSYNC and the internal horizontal synchronization signal HSYNC are generated.

Referring to FIGS. 1 and 8B, in the switching mode, the synchronization packet detector 113_1 may detect the synchronization packet SYNC_PAC and transmit the detected synchronization packet SYNC_PAC to the delay calculator 113_3. The delay calculator 113_3 may calculate a delay time TD.

The delay calculator 113_3 may acquire the difference time between the reception time of the vertical synchronization packet of the synchronization packet SYNC_PAC and the generation time of generating the internal vertical synchronization signal VSYNC, and may calculate a delay time TD using the difference time and the reference time TR. Accordingly, a new reference time may be set, and based on the newly changed reference time, the delay calculator 113_3 may transmit the flag control signal FCS to the flag generator 116.

In the switching mode, the synchronization controller 113 may directly determine a timing and a generation period at which the internal vertical synchronization signal VSYNC and the internal horizontal synchronization signal HSYNC are generated.

Referring to FIGS. 1 and 8C, when the reference time coincides with the calculated delay time, the display driving circuit 110 may operate in a video mode. In the video mode, the synchronization packet detector 113_1 may detect the synchronization packet SYNC_PAC and transmit the detected synchronization packet SYNC_PAC to the synchronization signal generator 113_2, and the synchronization signal generator 113_2 may generate an internal vertical synchronization signal VSYNC and an internal horizontal synchronization signal HSYNC based on the vertical synchronization packet and the horizontal synchronization packet included in the synchronization packet SYNC_PAC. For example, the synchronization signal generator 113_2 may generate the internal vertical synchronization signal VSYNC based on the vertical synchronization packet included in the synchronization packet SYNC_PAC, and generate the internal horizontal synchronization signal HSYNC based on the horizontal synchronization packet included in the synchronization packet SYNC_PAC.

That is, in the video mode, the synchronization controller 113 does not directly determine the timing and generation period at which the internal vertical synchronization signal VSYNC and the internal horizontal synchronization signal HSYNC are generated, but may determine the timing and generation period based on the received synchronization packet SYNC_PAC.

FIG. 9 are flowcharts illustrating a method of operating a display driving circuit according to example embodiments of the inventive concepts. FIG. 9 is a flowchart illustrating an operation of a display driving circuit in a video mode. That is, the display driving circuit may perform operations S100 to S700 in the video mode, and the video mode may include the normal video mode and the video memory mode.

Referring to FIGS. 1 and 9, in operation S100, the display driving circuit 110 may calculate a delay time between the generation time of the flag signal TE and the reception time of the synchronization packet SYNC_PAC in the video mode. For example, the display driving circuit 110 may obtain a difference time between the reception time of the synchronization packet SYNC_PAC and the generation time of the internal vertical synchronization signal VSYNC, and may calculate a delay time using the reference time TR and the difference time. In the following operations, the image data IDT may be stored in the memory based on the result of comparing the delay time with the reference time TR, and the generation time of the second flag signal may be adjusted by changing the reference time TR based on the delay time.

The display driving circuit 110 may determine whether the delay time coincides with the reference time TR in operation S200. When the delay time coincides with the reference time TR, the display driving circuit 110 may operate in the normal video mode in operation S300. As described in FIG. 8C, in the normal video mode, the synchronization controller 113 does not directly determine the timing and generation period at which the internal vertical synchronization signal VSYNC and the internal horizontal synchronization signal HSYNC are generated, but may determine the timing and generation period based on the received synchronization packet SYNC_PAC. Image data IDT received from the host 200 in the normal video mode may not be stored in the memory 112 and may be provided to the display controller 114 through the interface 111. Even after operation S300 operating in the normal video mode, operations S100 to S700 may be performed again.

The display driving circuit 110 may determine whether the delay time is less than the reference time TR in operation S400. When the delay time is less than the reference time TR, the display driving circuit 110 may perform operations S600 and S700, and when the delay time is greater than the reference time TR, the display driving circuit 110 may perform operations S500 to S700. At least some of operations S500 to S700 may be performed in parallel with each other.

The display driving circuit 110 may increase the section of the corresponding frame at the time when the synchronization packet SYNC_PAC is received in operation S500. When the synchronization packet SYNC_PAC is received later than the expected time (time elapsed by the reference time TR from the generation time of the flag signal TE), it becomes difficult to generate the internal synchronization signals VSYNC and HSYNC based on the synchronization packet SYNC_PAC, so the display driving circuit 110 may increase a section of a corresponding frame without generating the internal vertical synchronization signal VSYNC to start a new frame. In some example embodiments, the display driving circuit 110 may increase the section of the frame in a luminance adjustment unit, and the frame section that increases depending on the delay time may be adjusted. For example, as the delay time increases, the increasing frame period may increase. Because the display driving circuit 110 according to the inventive concepts adjusts the length of the frame section in the luminance adjustment unit, a change in luminance of an image displayed on the display panel 120 may be reduced or prevented despite an increase in the frame section.

The display driving circuit 110 may store the image data IDT received from the host 200 in the memory 112 in operation S600. When the synchronization packet SYNC_PAC from the host 200 is received by the display driving circuit 110 at a time different from the expected time (e.g., the time elapsed by the reference time TR from the generation time of the flag signal TE), by temporarily storing the image data IDT in the memory 112 even while the video mode is being performed, the display driving circuit 110 may operate in the memory video mode. The display driving circuit 110 may temporarily store the image data IDT in the memory 112 and then provide signals to the display panel 120 so that an image is displayed on the display panel 120 based on the image data IDT.

The display driving circuit 110 may adjust the generation time of the next flag signal TE to be transmitted following the flag signal TE by changing the reference time TR based on the delay time in operation S700. For example, the display driving circuit 110 may change the reference time TR to coincide with the delay time, and accordingly adjust the generation time of the next flag signal TE. After operation S700 is performed, operations S100 to S700 may be performed again.

The display driving circuit 110 according to the inventive concepts may operate in the normal video mode or the video memory mode based on the reception time of the synchronization packet SYNC_PAC received from the outside even while operating in the video mode. When the reception time of the synchronization packet SYNC_PAC received from the outside is different from the expected time, the image data IDT may be temporarily stored in the memory 112, so that the display driving circuit 110 may operate similarly to that in the command mode. In the video memory mode, by changing the generation time of the next flag signal TE and the reference time TR, the display driving circuit 110 may adjust the synchronization packet SYNC_PAC to be received from the host 200 at an expected time in the next frame. Accordingly, in displaying different images on the display panel 120 in the video mode, the display driving circuit 110 enables smooth image conversion.

Figure 10:
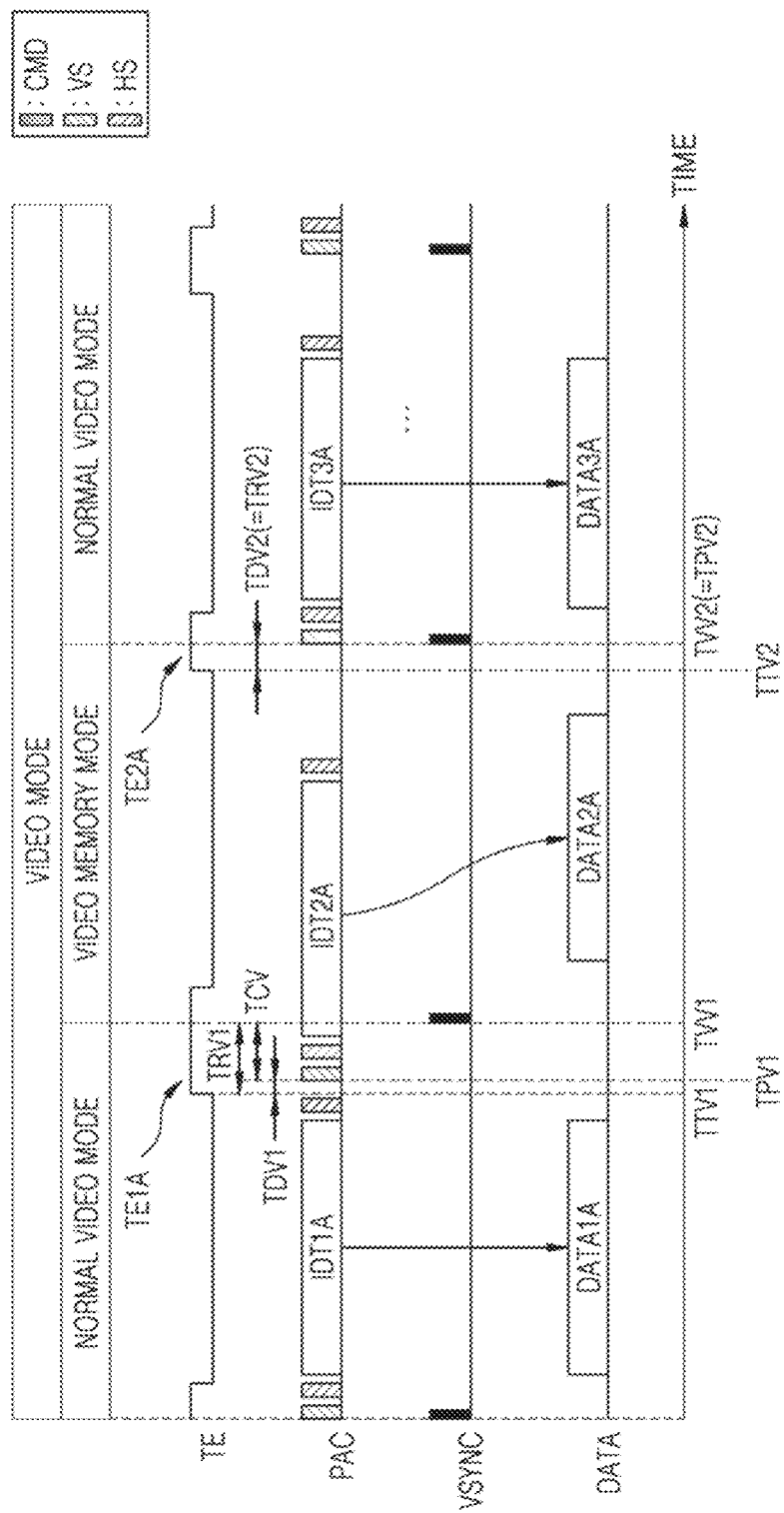
FIGS. 10 and 11 are timing diagrams for describing an operation of a display driving circuit according to example embodiments of the inventive concepts.
Figure 11:
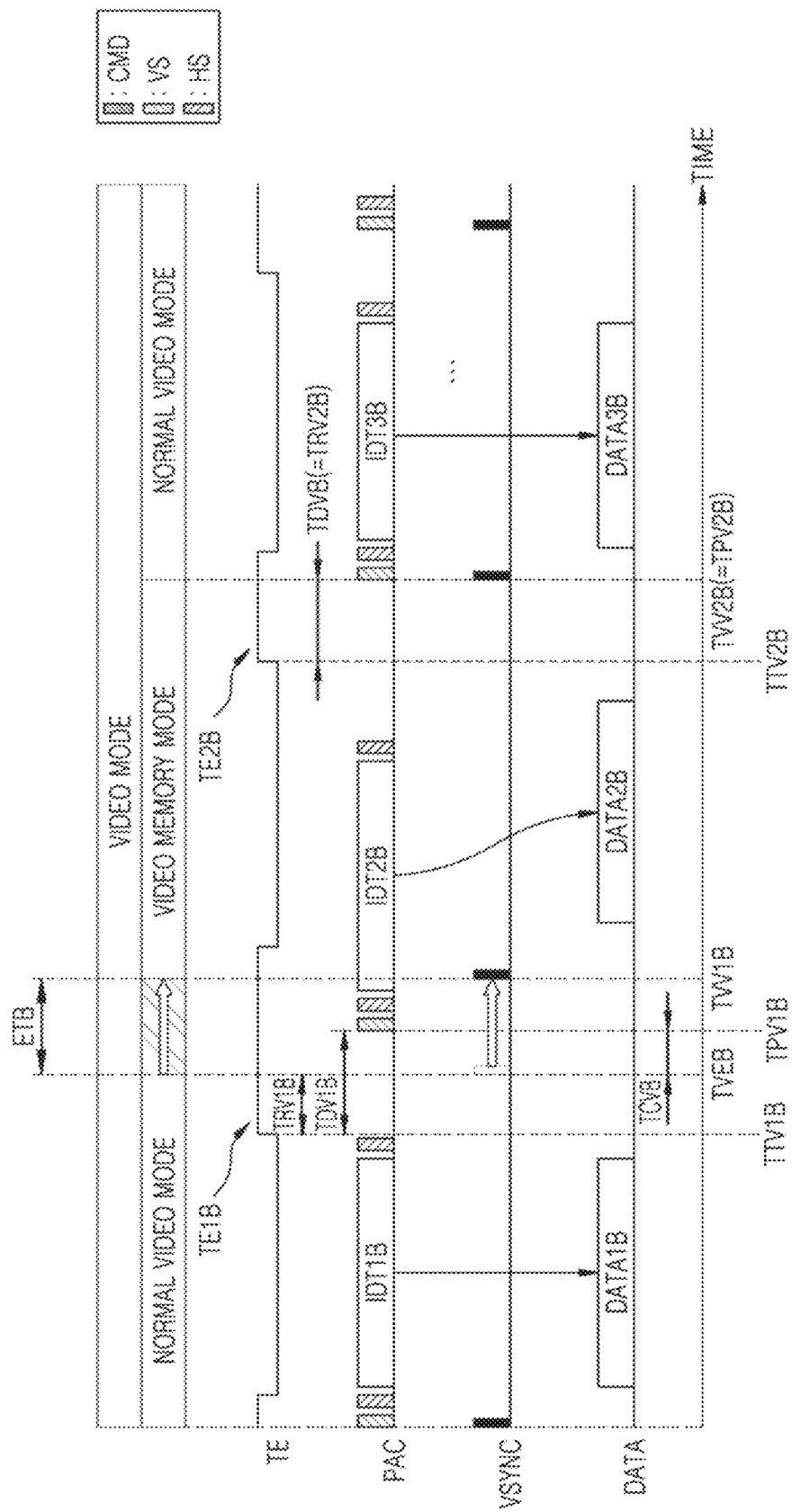

FIGS. 10 and 11 are timing diagrams for describing an operation of a display driving circuit according to example embodiments of the inventive concepts. FIGS. 10 and 11 are timing diagrams for explaining an operation of a display driving circuit in a video mode. In the description of FIG. 11, descriptions previously given with reference to FIG. 5 will be omitted.

Referring to FIGS. 1 and 10, the display driving circuit 110 may receive the packet PAC from the host 200 and may transmit the flag signal TE to the host 200. The packet PAC may include a command CMD, image data IDT1A, IDT2A, and IDT3A, a vertical synchronization packet VS, and a horizontal synchronization packet HS. First image data IDT1A, second image data IDT2A, and third image data IDT3A may be sequentially received from the host 200 to the display driving circuit 110.

When the delay time coincides with a preset reference time, the display driving circuit 110 may operate in the normal video mode. Accordingly, the first image data IDT1A received from the host 200 is not stored in the memory 112, but is directly converted to first data DATA1A, and an image based on the first data DATA1A may be displayed on the display panel 120.

The display driving circuit 110 may transmit a first flag signal TE1A to the host 200 based on a first reference time TRV1, and the host 200 may receive the first flag signal TE1A and transmit the vertical synchronization packet VS. In some example embodiments, a first reception time TPV1 of the vertical synchronization packet VS based on the first flag signal TE1A may be delayed by a first delay time TDV1 from a first generation time TTV1 of the first flag signal TE1A.

Depending on the preset first reference time TRV1, the display driving circuit 110 may generate the first flag signal TE1A and then generate the internal vertical synchronization signal V SYNC after the first reference time TRV1 has elapsed.

In FIG. 10, an example in which a first delay time TDV1 is shorter than a preset first reference time TRV1 is described. The display driving circuit 110 may calculate a first delay time TDV1 by calculating a difference value between the first reference time TRV1 and a difference time TCV. In some example embodiments, the difference time TCV may be a time between the first reception time TPV1 of the vertical synchronization packet VS based on the first flag signal TE1A and a generation time TVV1 of generating the internal vertical synchronization signal VSYNC.

Because the first reception time TPV1 of the vertical synchronization packet VS based on the first flag signal TE1A does not coincide with the generation time TVV1 at which the internal vertical synchronization signal VSYNC is generated, the display driving circuit 110 may operate in the video memory mode, and the second image data IDT2A received after transmitting the first flag signal TE1A may be stored in the memory 112 and then be converted into second data DATA2A when a predetermined or alternatively, desired time elapses.

The display driving circuit 110 may newly set a second reference time TRV2 based on the first delay time TDV1. For example, the second reference time TRV2 may be set to coincide with the first delay time TDV1, and may be calculated by subtracting the difference time TCV from the first reference time TRV1.

The display driving circuit 110 may adjust a second generation time TTV2 of the second flag signal TE2A based on the second reference time TRV2. The display driving circuit 110 may transmit the second flag signal TE2A to the host 200 at the adjusted second generation time TTV2, and the host 200 may transmit the vertical synchronization packet VS by receiving the second flag signal TE2A. In some example embodiments, the second reception time TPV2 of the vertical synchronization packet VS based on the second flag signal TE2A may be delayed by a second delay time TDV2 from the second generation time TTV2 of the second flag signal TE2A.

The second delay time TDV2 may coincide with the second reference time TRV2. As the second delay time TDV2 coincides with the second reference time TRV2, a second reception time TPV2 of the vertical synchronization packet VS received after the display driving circuit 110 transmits the second flag signal TE2A may coincide with a generation time TVV2 at which the internal vertical synchronization signal VSYNC is generated. Accordingly, the display driving circuit 110 may operate in a normal video mode after transmitting the second flag signal TE2A, and the third image data IDT3A received after transmitting the second flag signal TE2A is not stored in the memory 112 and may be directly converted into third data DATA3A. However, unlike in FIG. 10, when the second delay time TDV2 is different from the second reference time TRV2, the display driving circuit 110 may operate in the video memory mode, and the third image data IDT3A may be temporarily stored in the memory 112.

Referring to FIGS. 1 and 11, the display driving circuit 110 may receive a packet PAC from the host 200 and may transmit a flag signal TE to the host 200. The packet PAC may include a command CMD, image data IDT1B, IDT2B, and IDT3B, a vertical synchronization packet VS, and a horizontal synchronization packet HS. First image data IDT1B, second image data IDT2B, and third image data IDT3B may be sequentially received from the host 200 to the display driving circuit 110.

When the delay time coincides with a preset reference time, the display driving circuit 110 may operate in a normal video mode. Accordingly, the first image data IDT1B received from the host 200 is not stored in the memory 112, but is directly converted to the first data DATA1B, and an image based on the first data DATA1B may be displayed on the display panel 120.

The display driving circuit 110 may transmit a first flag signal TE1B to the host 200 based on a first reference time TRV1B, and the host 200 may receive the first flag signal TE1B and then transmit the vertical synchronization packet VS. In some example embodiments, a first reception time TPV1B of the vertical synchronization packet VS based on the first flag signal TE1B may be delayed by the first delay time TDV1B from a first generation time TTV1B of the first flag signal TE1B.

The display driving circuit 110 may be set to generate an internal vertical synchronization signal VSYNC, after the first flag signal TE1B is generated and then the first reference time TRV1B has elapsed. However, because the display driving circuit 110 generates an internal vertical synchronization signal VSYNC using the vertical synchronization packet VS received from the host 200 in the video mode, when the first delay time TDV1B is longer than the first reference time TRV1B, it may be difficult to generate the internal vertical synchronization signal VSYNC using the vertical synchronization packet VS. Therefore, when the vertical synchronization packet VS is not received even after the first reference time TRV1B elapses after generating the first flag signal TE1B, the display driving circuit 110 may increase the frame by the extended time ETB. That is, by generating the internal vertical synchronization signal VSYNC after the extended time ETB from a time TVEB at which the first reference time TRV1B has elapsed after generating the first flag signal TE1B, the display driving circuit 110 may increase a section of a frame in which an image based on the first data DATA1B is displayed on the display panel 120 and may delay the generation time TVV1B of the internal vertical synchronization signal VSYNC corresponding to the first flag signal TE1B later than the time TVEB when the first reference time TRV1 elapses after generating the first flag signal TE1B.

In FIG. 11, an example in which the first delay time TDV1B is longer than the preset first reference time TRV1B is described. The display driving circuit 110 may calculate the first delay time TDV1B by adding the first reference time TRV1B to the difference time TCVB. In some example embodiments, the difference time TCVB may be a time between the first reception time TPV1B of the vertical synchronization packet VS based on the first flag signal TE1B and the time TVEB at which the first reference time TRV1B has elapsed after generating the first flag signal TE1B.

Because the first reception time TPV1B of the vertical synchronization packet VS based on the first flag signal TE1B does not coincide with a generation time TVV1B at which the internal vertical synchronization signal VSYNC is generated, the display driving circuit 110 may operate in the video memory mode, and the second image data IDT2B received after transmitting the first flag signal TE1B may be stored in the memory 112 and then be converted into second data DATA2B when a predetermined or alternatively, desired time elapses.

The display driving circuit 110 may newly set the second reference time TRV2B based on the first delay time TDV1B. For example, the second reference time TRV2B may be set to coincide with the first delay time TDV1B, and may be calculated by adding the difference time TCVB to the first reference time TRV1B.

The display driving circuit 110 may adjust a second generation time TTV2B of the second flag signal TE2B based on the second reference time TRV2B. The display driving circuit 110 may transmit the second flag signal TE2B to the host 200 at the adjusted second generation time TTV2B, and the host 200 may transmit the vertical synchronization packet VS by receiving the second flag signal TE2B. In some example embodiments, the second reception time TPV2B of the vertical synchronization packet VS based on the second flag signal TE2B may be delayed by a second delay time TDV2B from the second generation time TTV2B of the second flag signal TE2B.

The second delay time TDV2B may coincide with the second reference time TRV2B. As the second delay time TDV2B coincides with the second reference time TRV2B, the second reception time TPV2B of the vertical synchronization packet VS received after the display driving circuit 110 transmits the second flag signal TE2B may coincide with the generation time TVV2B at which the internal vertical synchronization signal VSYNC is generated. Accordingly, the display driving circuit 110 may operate in a normal video mode after transmitting the second flag signal TE2B, and the third image data IDT3B received after transmitting the second flag signal TE2B is not stored in the memory 112 and may be directly converted into third data DATA3B. However, unlike in FIG. 11, when the second delay time TDV2B is different from the second reference time TRV2B, the display driving circuit 110 may operate in the video memory mode, and the third image data IDT3B may be temporarily stored in the memory 112.

Figure 12:
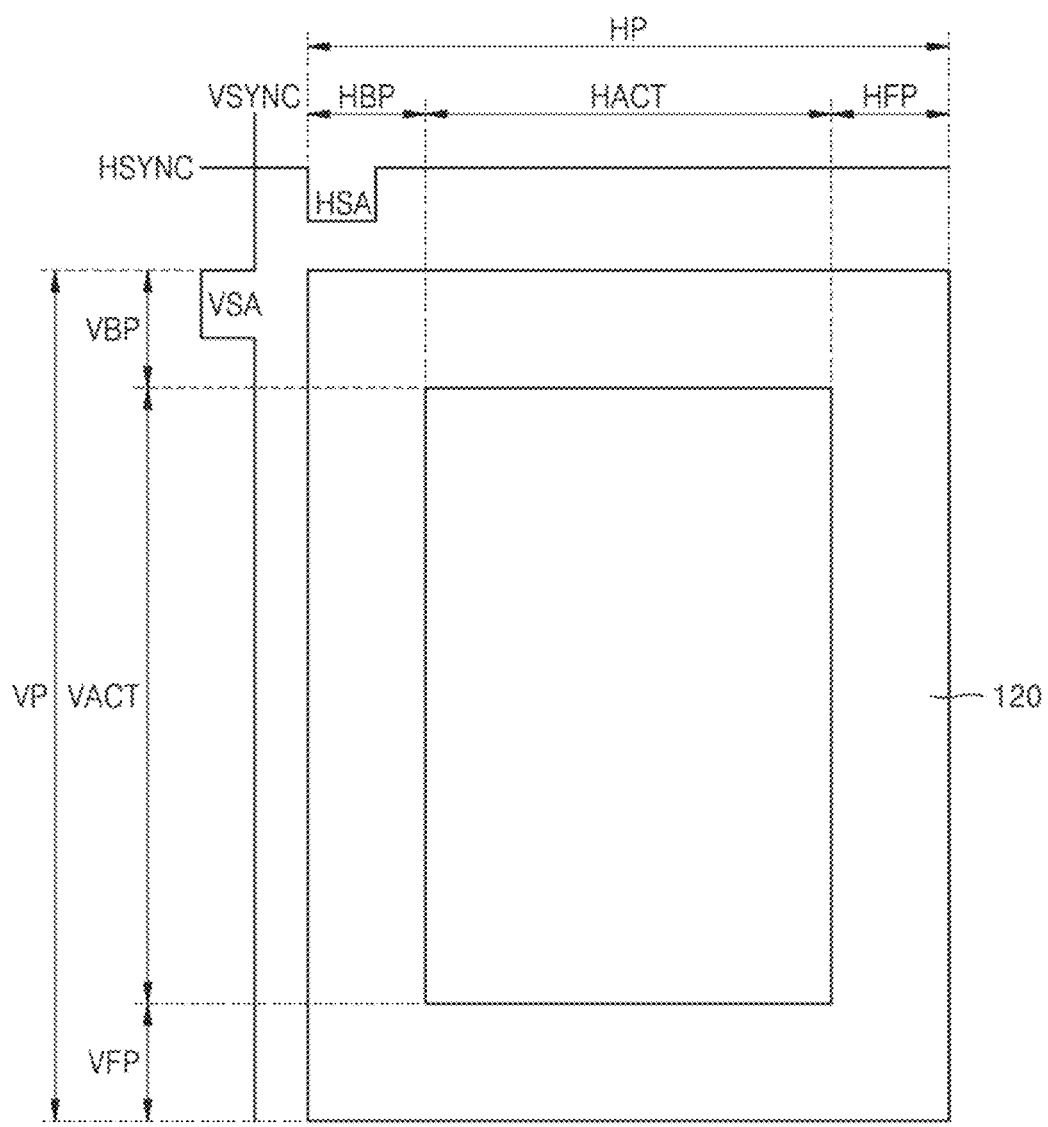
FIG. 12 is a diagram illustrating an internal vertical synchronization signal and an internal horizontal synchronization signal generated by a display driving circuit according to example embodiments of the inventive concepts.

FIG. 12 is a diagram illustrating an internal vertical synchronization signal and an internal horizontal synchronization signal generated by a display driving circuit according to example embodiments of the inventive concepts.

Referring to FIG. 12, the display panel 120 may be operated by an internal vertical synchronization signal VSYNC having a vertical period VP and an internal horizontal synchronization signal HSYNC having a horizontal period HP. The vertical period VP may include a first vertical porch period VBP, a vertical active period VACT, and a second vertical porch period VFP, and the first vertical porch period VBP may include a vertical speed action VSA, which is a vertical response period. In example embodiments, the first vertical porch period VBP may be a vertical back porch period, and the second vertical porch period VFP may be a vertical front porch period. The vertical period VP may correspond to one frame period.

The horizontal period HP may include a first horizontal porch period HBP, a horizontal active period HACT, and a second horizontal porch period HFP, and the first horizontal porch period HBP may include a horizontal speed action HSA, which is a horizontal response period. In example embodiments, the first horizontal porch period HBP may be a horizontal back porch period, and the second horizontal porch period HFP may be a horizontal front porch period.

Scanning for a plurality of scan lines (for example, SL1 to SLn in FIG. 2) included in the display panel 120 and data input for pixels connected to the scanned scan lines are performed during vertical and horizontal active periods VACT and HACT. That is, the plurality of scan lines SL1 to SLn may be sequentially scanned during the vertical active period VACT, and data input to a pixel connected to the scanned scan line may be performed during the horizontal active period HACT.

The operation of increasing the frame period described with reference to FIGS. 7, 9 and 11 may mean increasing the second vertical porch period VFP included in the vertical period VP of the internal vertical synchronization signal VSYNC.

Figure 13A:
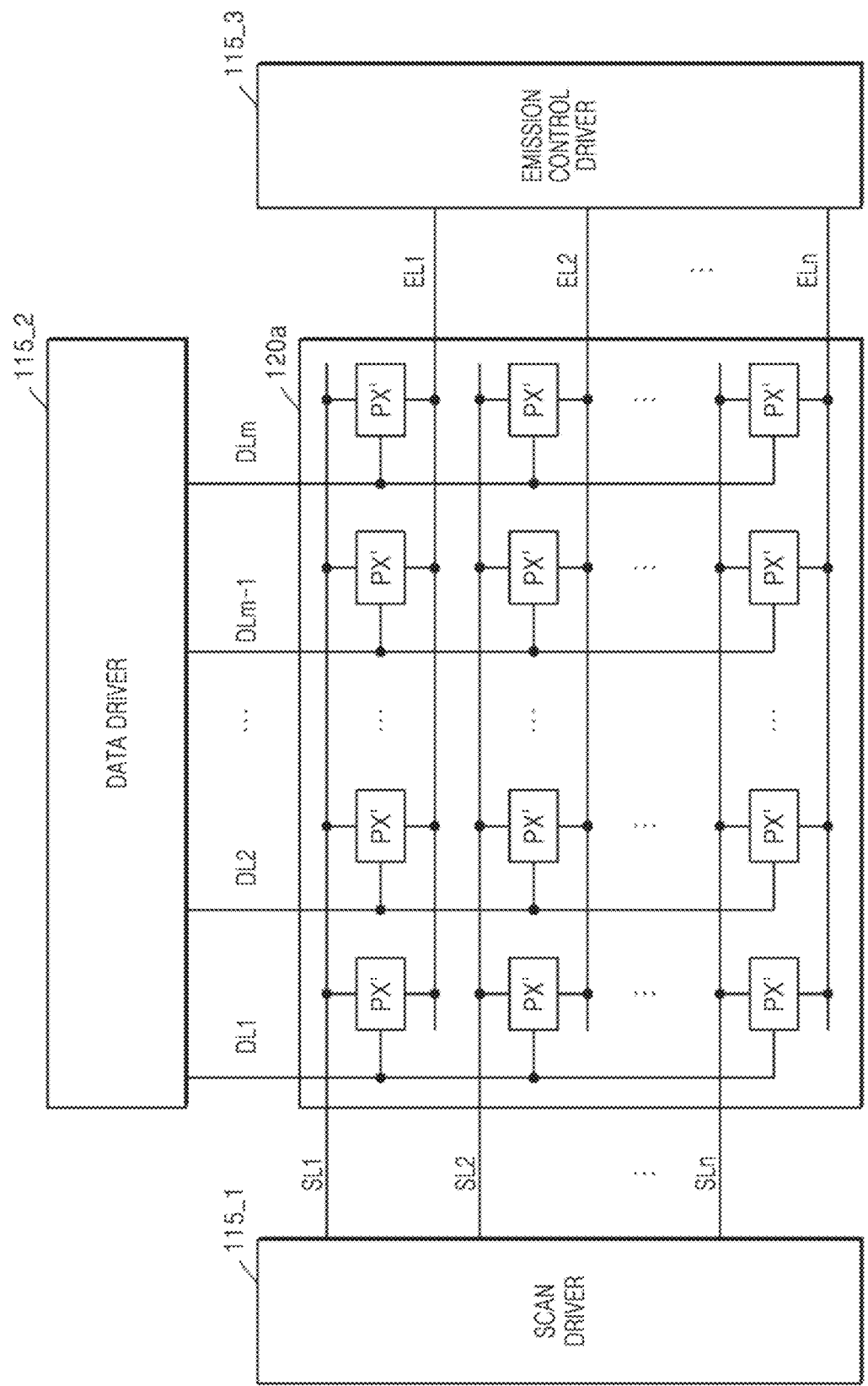
FIG. 13A is a block diagram illustrating a partial configuration of a display device according to example embodiments of the inventive concepts.
Figure 13B:
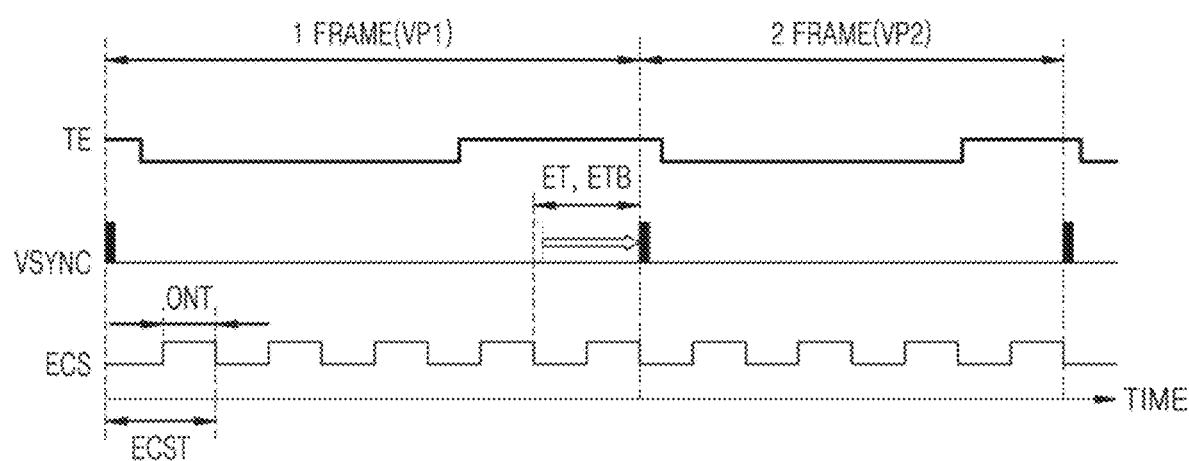
FIG. 13B is a timing diagram illustrating an operation of a display driving circuit according to example embodiments of the inventive concepts.

FIG. 13A is a block diagram illustrating a partial configuration of a display device according to example embodiments of the inventive concepts, and may correspond to the driver 115 and the display panel 120 of FIG. 1. FIG. 13B is a timing diagram illustrating an operation of a display driving circuit according to example embodiments of the inventive concepts. In FIG. 13A, the OLED panel is described as an example of the display panel 120 of FIG. 1, and redundant descriptions of the same reference numerals as in FIG. 2 will be omitted.

Referring to FIGS. 13A and 13B, a display panel 120a includes a plurality of data lines DL1 to DLm, a plurality of scan lines SL1 to SLn, a plurality of emission control lines EL1 to ELn, and a plurality of pixels PX' between the lines. Each of the plurality of pixels PX' may be connected to a corresponding scan line, a data line, and an emission control line.

A light emission control driver 115_3 may be connected to the plurality of emission control lines EL1 to ELn, and may control an emission time of the pixels PX' by sequentially applying the emission control signals ECS to the pixels PX'. Each of the pixels PX' may include a corresponding OLED, and may include a transistor that supplies a driving current corresponding to an image signal to the OLED or blocks the driving current supplied to the OLED. The emission control signal ECS provided through each of the plurality of emission control lines EL1 to ELn may turn on/off the transistor that provides the driving current to the OLED, thereby controlling the emission time of the OLED.

The luminance value of each of the pixels PX' may vary depending on the duty ratio of the emission control signal ECS. As the duty ratio (e.g., the length of the on period ONT of the emission control signal ECS compared to the period ECST of the emission control signal ECS) of the emission control signal ECS increases, the emission time of the pixels PX' may increase, and the luminance of the pixels PX' may increase. In this way, the light emission control driver 115_3 may adjust the luminance of the display panel 120a by adjusting the pulse width modulation (PWM) of the light emission control signal ECS under the control of the display controller 114.

One frame period corresponding to the period of the internal vertical synchronization signal VSYNC may increase or decrease in units of the period ECST of the emission control signal ECS. Accordingly, the operation of increasing the period of the frame described with reference to FIGS. 7, 9, and 11 may be performed in units of the period ECST of the emission control signal ECS. In some example embodiments, the unit of the period ECST of the emission control signal ECS may be a luminance adjustment unit of the pixels PX'.

When the internal vertical synchronization signal VSYNC is received later than the expected time, the display driving circuit according to the inventive concepts may increase the corresponding frame (That is, the first vertical period VP1 of the internal vertical synchronization signal VSYNC) by the extension time ET and ETB. In some example embodiments, the extension times ET and ETB may be a multiple of the period ECST of the emission control signal ECS, that is, a multiple of the luminance adjustment unit. Accordingly, even if the frame period is increased, the luminance of the display panel 120a may be maintained, and as the operation mode is changed, flicker that appears to change the luminance of the display panel 120a may be reduced or prevented.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. A display driving circuit operating in a video mode and a command mode, the display driving circuit comprising:
   an interface configured to receive a synchronization packet and image data from the outside;
   a memory configured to receive the image data from the interface in the command mode;
   a synchronization controller configured to receive the synchronization packet from the interface and generate a flag control signal and an internal synchronization signal;
   a flag generator configured to generate a first flag signal and a second flag signal in response to the flag control signal; and
   an image controller configured to receive the image data from the memory in the command mode, receive the image data from the interface in the video mode, and drive a display panel based on the image data,
   wherein the synchronization controller is configured to calculate a delay time between a generation time of the first flag signal and a reception time of the synchronization packet, and is configured to adjust a generation time of the second flag signal based on the delay time.

2. The display driving circuit of claim 1, wherein the synchronization controller is configured to generate the flag control signal and the internal synchronization signal based on a reference time, and is configured to adjust a generation time of the second flag signal by changing the reference time based on a result of comparing the delay time with the reference time.

3. The display driving circuit of claim 2, wherein the synchronization controller, when the delay time is longer than the reference time, is configured to delay the generation time of the internal synchronization signal to after the reception time of the synchronization packet.

4. The display driving circuit of claim 1, wherein the synchronization controller includes a synchronization packet detector configured to receive the synchronization packet;
   a synchronization signal generator configured to generate the internal synchronization signal;
   a delay calculator configured to calculate the delay time to generate the flag control signal; and
   an internal synchronization controller configured to control the synchronization signal generator.

5. The display driving circuit of claim 4, wherein, in the command mode, the synchronization signal generator is configured to control the generation time of the internal synchronization signal according to the control of the internal synchronization controller.

6. The display driving circuit of claim 4, wherein, in a switching mode in preparation for switching from the command mode to the video mode, the delay calculator is configured to generate the flag control signal based on a result of calculating the delay time.

7. The display driving circuit of claim 4, wherein, in the video mode, the delay calculator is configured to generate the flag control signal based on a result of calculating the delay time.

8. A method of operating a display driving circuit operating in a video mode and a command mode, the method comprising:
   receiving, from a host, a command for changing from the command mode to the video mode;
   generating a first flag signal to transmit the generated first flag signal to the host;
   receiving a synchronization packet depending on the first flag signal; and
   adjusting a generation time of a second flag signal and switching a mode to the video mode, based on a delay time between a generation time of the first flag signal and a reception time of the synchronization packet depending on the first flag signal.

9. The method of claim 8, wherein the switching of the mode to the video mode includes switching the mode to the video mode when the delay time coincides with a reference time, and
   the reference time is a time between a time when a certain flag signal is generated and a time when the synchronization packet depending on the certain flag signal is predicted to be received.

10. The method of claim 8, wherein the switching of the mode to the video mode includes storing image data received from the host in a memory when the delay time is different from a reference time; and
    adjusting a generation time of the second flag signal by adjusting the reference time based on the delay time, and switching a mode to the video mode,
    wherein the reference time is a time between a time when a certain flag signal is generated and a time when the synchronization packet depending on the certain flag signal is predicted to be received.

11. The method of claim 10, wherein the switching of the mode to the video mode further includes increasing a frame period by delaying a generation time of an internal synchronization signal corresponding to the image data when the delay time is greater than the reference time.

12. The method of claim 11, wherein the increasing of the frame period includes increasing the frame period by a multiple of a luminance adjustment unit.

13. A method of operation a display driving circuit, the method comprising:
    generating a first flag signal and transmitting the generated first flag signal to a host;
    receiving a synchronization packet depending on the first flag signal and image data;
    storing the image data in a memory based on a result of comparing a delay time between a generation time of the first flag signal and a reception time of the synchronization packet depending on the first flag signal with a reference time; and
    adjusting a generation time of a second flag signal by changing the reference time based on the delay time.

14. The method of claim 13, wherein the display driving circuit operates in a command mode for directly generating internal synchronization signals, a video mode generating the internal synchronization signals based on the synchronization packet received from the host, and a switching mode in preparation for switching from the command mode to the video mode, and the storing of the image data in a memory and the adjusting of the generation time of the second flag signal are performed in the switching mode.

15. The method of claim 14, wherein the video mode includes a normal video mode for generating the internal synchronization signals based on the synchronization packet received from the host, and a video memory mode for directly generating the internal synchronization signals, and wherein the storing of the image data includes comparing the delay time with the reference time in the normal video mode, and storing the image data in a memory in the video memory mode when the delay time is different from the reference time.

16. The method of claim 13, wherein the storing of the image data in a memory includes storing the image data received from the host in the memory when the delay time is different from the reference time.

17. The method of claim 13, wherein the storing of the image data in a memory includes increasing a frame period by delaying a generation time of the internal synchronization signals corresponding to the image data when the delay time is greater than the reference time.

18. The method of claim 17, wherein the increasing of the frame period includes increasing the frame period by a multiple of a luminance adjustment unit.

19. The method of claim 13, wherein the adjusting of the generation time of the second flag signal includes adjusting the reference time to coincide with the delay time.

20. The method of claim 19, wherein the adjusting of the reference time to coincide with the delay time includes calculating a difference time between a time at which the synchronization packet is received and a time at which an internal vertical synchronization signal is generated, and adjusting the reference time to coincide with the delay time based on the difference time.

* * * * *